A. RASMUSSEN.
CULTIVATOR.
APPLICATION FILED FEB. 3, 1914.
1,114,520.
Patented Oct. 20, 1914.
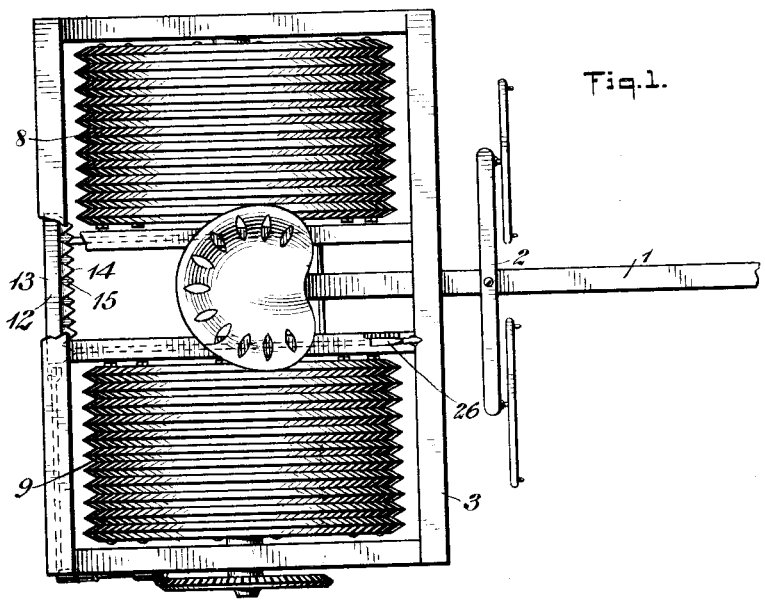
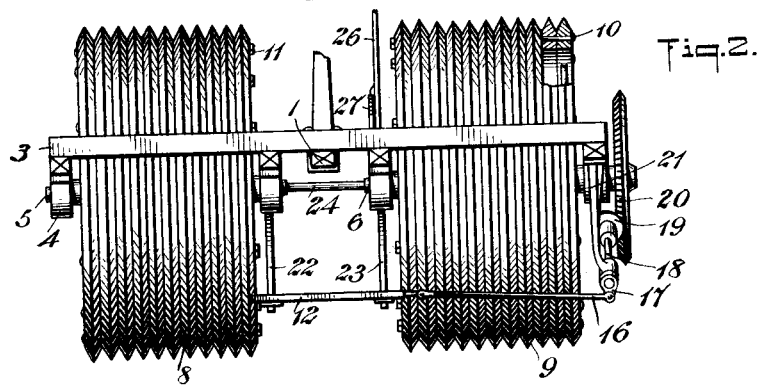
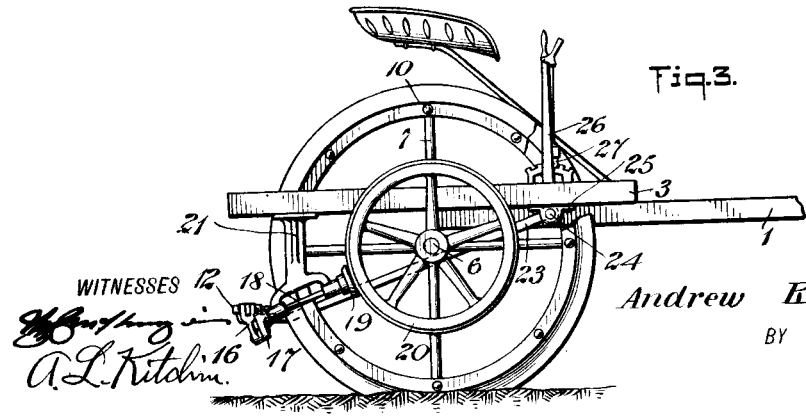
INVENTOR
Andrew Rasmussen
BY
ATTORNEYS
WITNESSES

UNITED STATES PATENT OFFICE.

ANDREW RASMUSSEN, OF EDGEMONT, SOUTH DAKOTA.

CULTIVATOR.

1,114,520.  Specification of Letters Patent.  Patented Oct. 20, 1914.

Application filed February 3, 1914. Serial No. 816,198.

*To all whom it may concern:*

Be it known that I, ANDREW RASMUSSEN, a citizen of the United States, and a resident of Edgemont, in the county of Fall River and State of South Dakota, have invented a new and Improved Cultivator, of which the following is a full, clear, and exact description.

This invention relates to improvements in cultivators, and particularly to a corn cultivator, and has for an object to provide an improved structure which is designed for use in what is known as dry farming, so as to maintain the soil in proper condition, and to reduce the foliage of the corn to a minimum, whereby the strength may go into the stalk and ear.

Another object in view is to provide a cultivating device which is provided with a pair of rollers, and with a cutter or knife, the rollers acting on the ground, and the cutter being designed to cut the tops of the corn so that both the corn and the soil are put in condition for producing the best results.

In carrying out the object of the invention a suitable frame is provided to which is journaled a pair of rollers. These rollers may be made smooth or corrugated, as desired, so as to beat down or stir up the soil, as circumstances may demand. This form of cultivator is designed to be used in connection with what is known as dry farming. In this form of farming the soil is worked to a certain extent without allowing the escape of moisture. In addition to the rollers either stirring up the soil or making the same smooth, a cutter is arranged in back of the rollers in line with the space between the rollers. This cutter operates at the same time that the rollers operate, so that as the device is moved across a corn field straddling a row of corn the tops of the corn will be severed and thereby reduce the amount of strength going to the foliage. This will allow all of the strength from the roots to be taken up by the stalk and thus causes an earlier and better development of the ear at the proper time. Suitable adjusting means are provided for raising or lowering the cutter so as to adapt the same to corn of various ages.

In the accompanying drawings—Figure 1 is a top plan view of an embodiment of the invention; Fig. 2 is a rear view of the structure shown in Fig. 1; Fig. 3 is a side view of the structure shown in Fig. 1.

Referring to the accompanying drawings by numeral, 1 indicates a tongue of any desired kind which is provided with draft members 2 and a frame 3. Mounted upon the frame 3 are suitable bearing members 4 in which are journaled shafts 5 and 6, which shafts have connected therewith the various spokes 7 of the rollers 8 and 9. In forming the rollers 8 and 9 the periphery may be made of a single piece and corrugated, or may be made in separate pieces and secured together by suitable bolts 10 and 11. As shown in Figs. 1 and 2 the rollers 8 and 9 are spaced apart so that a row of corn may be easily straddled.

In connection with rollers 8 and 9 a cutter structure 12 is provided which is formed with a casing 13 having suitable teeth 14 which co-act with the cutter knife 15. Knife 15 is connected with a pitman 16 (Fig. 2) which in turn is connected with a crank 17 operated by shaft 18. Shaft 18 carries a beveled pinion 19 meshing with gear 20 rigidly connected with shaft 6. A suitable bracket 21 is provided for supporting shaft 18 and holding the same in proper place so that pitman 16 may be properly operated. The cutter structure 12 is supported by arms 22 and 23 rigidly secured to shaft 24. Shaft 24 is journaled in suitable bearings 25 on frame 2, and is rigidly connected with lever 26, whereby the shaft may be rocked and the cutter structure 12 raised and lowered. A suitable catch 27 is provided for locking shaft 25 in any of its adjusted positions, whereby the cutter structure 12 may be operated at different heights according to the height of the corn.

In use, the device is drawn across a field of corn and straddles a row of corn so that the stalks of corn fall in line with the cutter structure 12. If the leaves of the corn have become sufficiently tall the knife 15 will sever the same, whereby the strength from the roots will pass into the stalk and thus cause the stalk to be quicker and better developed, which naturally results in a better crop. At the same time that the knife operates to remove the unnecessary leaves the rollers 8 and 9 pulverize to a greater or less extent the soil, especially at the surface, and thereby prevent undue evaporation, while allowing the chemicals in the soil to properly act on the roots of the corn for nourishing the same.

What I claim is—

In a cultivator of the class described, a frame, a pair of spaced cylindrical traction rollers carried by said frame, each of said rollers being provided with a grooved periphery, said grooves being arranged in planes normal to the axis of the rollers, an adjustable cutter arranged in line with the space between said rollers, and means for connecting the cutter with one of said rollers, whereby power may be transmitted to the cutter for causing the cutter to operate as the rollers rotate.

In testimony whereof I have signed my name to this specification in the presence of two subscribing witnesses.

ANDREW RASMUSSEN.

Witnesses:
 THOMAS COLGAN,
 H. H. THOMPSON.

---

Copies of this patent may be obtained for five cents each, by addressing the "Commissioner of Patents, Washington, D. C."